United States Patent [19]
Lesthievent

[11] Patent Number: 5,798,731
[45] Date of Patent: Aug. 25, 1998

[54] METHOD FOR LOCATING MOVING OBJECTS

[75] Inventor: Guy Lesthievent, Portet/Garonne, France

[73] Assignee: Centre National d'Etudes Spatiales, Paris Cedex, France

[21] Appl. No.: 608,052

[22] Filed: Feb. 28, 1996

[30] Foreign Application Priority Data

Mar. 22, 1995 [FR] France ................ 95 03335

[51] Int. Cl.$^6$ ................ H04B 7/185; G01S 5/02
[52] U.S. Cl. ................ 342/357; 701/213
[58] Field of Search ................ 342/357; 701/213

[56] References Cited

FOREIGN PATENT DOCUMENTS

WO 89/04002  5/1989  WIPO.
WO 90/13186  11/1990  WIPO.
WO 92/21181  11/1992  WIPO.

*Primary Examiner*—Theodore M. Blum
*Attorney, Agent, or Firm*—Oblon, Spivak, McClelland, Maier & Neustadt, P.C.

[57] ABSTRACT

The method of the invention is mixed and uses, in the forward link, the measurement of the phase of tones modulating a carrier and, in the backward link, a spectrum spread by pseudonoise code, which makes it possible to date the reception of the message.

Application to the location of miscellaneous moving objects (land, sea, air, etc.).

4 Claims, 1 Drawing Sheet

METHOD FOR LOCATING MOVING OBJECTS

DESCRIPTION

1. Technical Field

The present invention relates to a method for locating moving objects. It can be used in the management and control of large numbers of moving objects, i.e. cars, pleasure boats, ships, containers, railroad cars, trucks, aircraft, etc.

The invention has a particular application in the TAOS system proposed by the Centre National d'Etudes Spatiales. This system uses several satellites distributed over low circular orbits at altitudes below 1500 km and inclined by 50° to 60°. Each satellite carries a transparent transponder. The frequency bands used are UHF/VHF bands: whereby in the earth-satellite link use is made of the 148–150.05 MHz band and in the satellite-earth link the 137–138 MHz and 400.15–401 MHz band. The messages are transmitted in packets.

2. Prior Art

A bidirectional moving object locating method is known consisting of modulating a carrier with the aid of various sinusoidal signals called "tones". The moving object repeats these tones in a coherent manner. By measuring the phase of the tones received in the station, after transiting the moving object to be located, with respect to the phase in the transmitting station, it is possible to determine the distance between the station and the moving object. The carrier can e.g. have a frequency in the band 148–150 MHz and the tones a frequency distributed between 20 kHz for the tone having the highest frequency (called the major whole tone) and 10 Hz for the lowest frequency tone (called minor whole tone).

A European standard exists for this and was drawn up by the European Space Agency. It is described in the document "Ranging Standard", published by Data Handling and Signal Processing Division, European Space Research and Technology Centre, Noordwijk, Netherlands.

This procedure not only makes it possible to determine distances, but also distance variations on the basis of DOPPLER effect measurements. For this purpose, a measurement takes place of the frequency shifts between the different signals transmitted and received.

This procedure has the advantage of leading to a very simple terminal, because it operates at low frequency (generally the tones do not exceed 20 kHz). It is suitable when it is a question of locating one or a few moving objects. However, it cannot be used when there are numerous users, because the available frequency channel is inadequate for transmitting all the signals required.

Another radio location procedure is known, which obviates this disadvantage. This procedure uses spectrum spread and utilizes pseudonoise (PN) codes. A PN code is a periodic sequence of an uneven number of bits or "bribes". The spectrum spread consists of modulating the useful signal by such a PN code, the latter having a high bit rate compared with that of the data, followed by the modulation of a carrier by the composite signal obtained. The distance measurement of the moving objects can take place with the aid of such PN codes, dating the transmission and reception times of a particular event of the code relative to the clock of a spread spectrum signal receiver. This particular event is the start or finish of a specific bribe of the code.

For this spectrum spread procedure using pseudonoise codes in conjunction with radio location, reference can be made to the collective work entitled "Techniques et technologies des véhicules spatiaux", vol. 1, Cépaduès-Editions, 1994, and specifically to module 6 "Localisation spatiale" by Jean-Luc ISSLER, pp 561–634.

This technology is in particular used in unidirectional form in the so-called global positioning system or GPS for short.

Although this procedure allows a multiple access to the locating system and is consequently suitable in the case of a large number of users, it suffers from the disadvantage of leading to a certain complexity of the terminal placed in each module. Thus, said terminal must be able to receive and process the spread spectrum signals, which presupposes despreading means operating at a high frequency.

Thus, each of the known procedures has advantages and disadvantages. The object of the present invention is to propose a novel method avoiding the disadvantages, whilst maintaining the advantages.

DESCRIPTION OF THE INVENTION

The method according to the invention can be referred to as mixed in the sense that on the one hand it uses the locating procedure based on the measurement of the phase shift of tones and on the other uses the pseudo-noise code-spectrum spread procedure with dating. Thus, in the first case it makes it possible to retain the simplicity of equipments carried on the moving objects (phase measurement taking place at low frequency), so that there is no need to use complex terminals. In the second, it gives access to the service to a large number of users.

To this end, the method of the invention comprises a mixed bidirectional link, in that it is formed by a forward link, which is of the carrier type modulated by at least one tone and a backward link, which is of the pseudo-noise code spectrum spread type. Thus, the terminal carried in the moving object operates on reception by the phase shift of the tone or tones and on transmission by spectrum spread. The station operates in transmission by carrier modulated by at least one tone and in reception by despreading and dating. The complexity associated with the spectrum spread procedure is consequently transferred into the station.

More specifically, the invention relates to a method for locating moving objects, in which a forward-backward radio link is established between a ground station and a moving object to be located equipped with a terminal, through an artificial satellite, and the moving object is located on the basis of compared characteristics of radio signals of the forward-backward link, said method being characterized in that it comprises the following operations:

A) in the forward link:

from the ground station, transmission takes place at an instant counted with respect to a reference instant individual to the station, an outward signal constituted by a carrier having a given frequency modulated by at least one sinusoidal signal called a tone, each tone having a given frequency and a phase, the instantaneous phases of all the tones being zero at the reference instant individual to the station, the outward signal is received in the satellite and retransmission takes place of an outward signal with a certain time delay linked with the transit time in the satellite, the outward signal retransmitted by the satellite is received in the terminal of the moving object to be located and the phase of the tones received is measured at a particular instant, B) in the backward link:

a return signal is formed in the terminal of the moving object by modulating a carrier having a certain frequency by information corresponding to the results of the phase measurement of the tones and a spectrum spreading operation for said modulated carrier is carried out by a spreading code linked with a particular instant, from the terminal of the moving object is transmitted a spread spectrum return signal at said particular instant, said return signal is received in the satellite and a return signal is retransmitted with a certain time delay linked with the transit time in the satellite, in the station is received the return signal retransmitted by the satellite, the spectrum of the signal received is despread and then this signal is demodulated to restore the information relative to the measurement of the phase difference made in the moving object, the reception instant of these measurements is dated by intercorrelation between the spreading code received and an identical, expected code, on the basis of the phase measurement or measurements, the reception instant of the measurements, variations, the displacement between the measurement instant and the transmission instant, by the terminal of the transit times in the satellite, the station-satellite distance at the reception instant, the station-satellite distance at the transmission instant, the sum of the distances of the outward and return paths between the satellite and the moving object is deduced, which locates the moving object.

The particular instant can be displaced with respect to the measurement instant e.g. by a known quantity, or can be sufficiently close to the measurement instant to introduce a negligible error.

To this distance measurement can be added a conventional DOPPLER measurement. In this case, the transmission frequency of the terminal is dependent on the frequency of the forward link which it receives. The station can then combine the result of the distance measurements and that of the measurement of the DOPPLER effect, which makes it possible to minimize the messages to be transmitted from the terminal or remove certain ambiguities linked with the measurement of the phase shift of the tones, as will become more apparent hereinafter.

DESCRIPTION OF EMBODIMENTS

Figure 1:
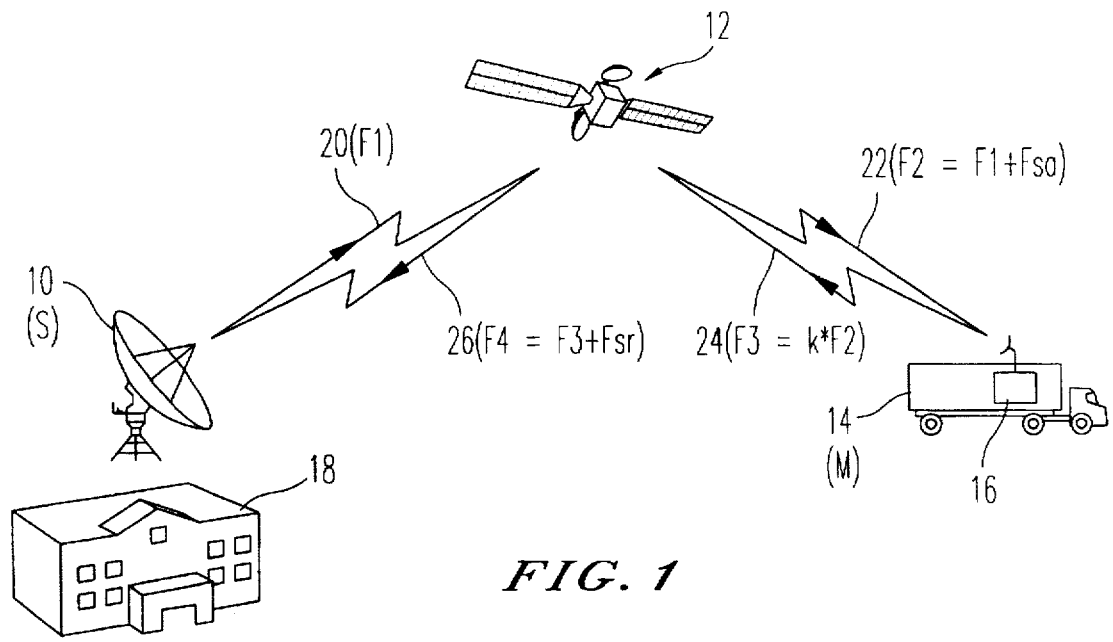
FIG. 1 describes the general organization of a moving object locating system using ground stations and satellites.

FIG. 1 shows a moving object locating system incorporating connection stations 10 (only one is shown), a satellite 12, moving objects 14 (only one is shown), each equipped with a terminal 16. The stations 10 are connected to an operational control centre 18.

A rising outward signal 20 is transmitted by the station 10 at a frequency $F_{1e}$. A falling outward signal 22 is retransmitted by the satellite at a frequency $F_{2e}$ and is received by the terminal 16. The frequency $F_{2e}$ can be displaced with respect to $F_{1r}$ by a quantity $F_{sa}$ equal to the frequency of a first local oscillator carried in the satellite and operating on the outward signal.

The terminal transmits a rising return signal 24 at a frequency $F_{3e}$, which can be proportional to the frequency $F_{2r}$ received in the terminal ($F_{3e}=KF_{2r}$). The satellite retransmits a falling return signal 26 at a frequency $F_{4e}$ displaced with respect to the frequency $F_{3r}$ by a quantity $F_{sr}$ equal to the frequency of a second local oscillator carried in the satellite and operating on the return signal.

Before describing in detail the process performed in such an installation according to the invention, the notations used will be defined:

Pe=signal transmitted by station,

Pr=signal received by terminal,

Se="tone" component of Pe,

Sr="tone" component of Pr,

Outward direction=station to terminal direction,

Return direction=terminal to station direction, $t_o$: reference time of station, $\delta t_1$: transmission time of outward signal, $t_2$: measurement time in terminal, $t_3$: transmission time of return signal by terminal, $t_4$: reception time by the station of the return signal, t=time delay in the terminal, $D_{jk}$=station-satellite distance if j=1 or satellite-terminal distance if j=2, when the signal is in the outward direction if k=a or in the return direction if k=r, so that four distances must be considered: $D_{1a}$, $D_{2a}$, $D_{1r}$, $D_{2r}$.

$t_{sa}$=transit time of outward signal in the satellite on the outward course, $t_{sr}$=transit time of return signal in the satellite on the return course, $f_i$=frequency of tone of rank i, $mt_i$=measurement performed by the terminal on the tone i, i.e. phase $\phi i$ of tone i, ms=time variation measured by the station between the reception time t4 and the reference time to, S=position of station, M=position of moving object, Ta=position of satellite on outward path, Tr=position of satellite on return path, Va=velocity vector of satellite on outward path, Vr=velocity vector of satellite on return path, $F_{1e}$=rising outward frequency transmitted by station, $F_{1r}$=rising outward frequency received by satellite, $F_{2e}$=falling outward frequency transmitted by satellite, $F_{2r}$=falling outward frequency received by terminal, $F_{3e}$=rising return frequency transmitted by terminal, $F_{3r}$=rising return frequency received by satellite, $F_{4e}$=falling return frequency transmitted by satellite, $F_{4r}$=falling return frequency received by station, $F_{sa}$=frequency of local oscillator or transposition of satellite in outward path, $F_{sr}$=frequency of local oscillator or transposition of satellite in return path, c=speed of light.

Note: The times are designated $t_i$ if they are referenced by the station and $\hat{t}_i$ if they are referenced by the terminal, i.e.

$$D_{1a}=|\vec{STa}(t_1)|, \quad D_{2a}=|\vec{MTa}(\hat{t}_2)|$$

$$D_{2r}=|\vec{MTr}(\hat{t}_3)|, \quad D_{1r}=|\vec{STr}(t_4)|$$

Figure 2:
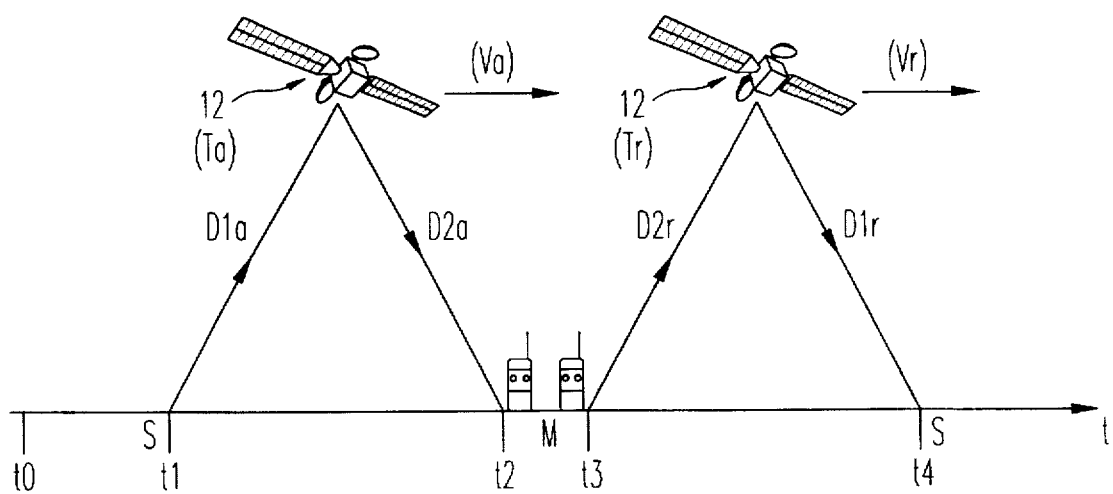
FIG. 2 is a timing diagram showing the emission and reception instants or times of various signals.

These notations are used in FIG. 2, which is a timing diagram showing the reference times to, transmission times $t_1$ of the outward signal, $t_2$ the reception times of the outward signal in the terminal, $t_3$ the transmission times of the return signal by the terminal, $t_4$ the reception times of the return signal in the station. FIG. 2 also shows the distances $D_{1a}$ and $D_{1r}$, separating the station from the satellite at instants or times $t_1$ and $t_4$ and the distances $D_{2a}$ and $D_{2r}$, separating the moving object from the station at times or instants $t_2$ and $t_3$.

The principle of the measurement carried out according to the invention is based on a first, so-called "outward equation", based on the measurement of the phases of the tones and on a second, so-called "return equation", based on the dating of the return signal in the station, dating being made possible by the use of the spreading code. Thus, these two equations will firstly be established.

Outward Equation

The signal Pr received by the terminal in t2 is dependent on the signal Pe emitted by the station and the difference $\hat{t}_2 - \hat{t}_o$, which is dependent on the time $D_{1a}/c$ taken by the signal to reach the satellite, the time $D_{2a}/c$ taken by the signal to reach the moving object from the satellite and the transit time $t_{sa}$ in the satellite, so that we obtain:

$$P_r(\hat{t}_2 - \hat{t}_o) = P_e \left( \hat{t}_2 - \frac{D_{1a}}{c} - t_{sa} - \frac{D_{2a}}{c} - \hat{t}_o \right)$$

In the same way for Sr, the signal Sr is the tone component of Pr, giving:

$$S_r(\hat{t}_2 - \hat{t}_o) = S_e \left( \hat{t}_2 - \frac{D_{1a}}{c} - t_{sa} - \frac{D_{2a}}{c} - \hat{t}_o \right)$$

For each tone i the terminal consequently measures a phase $mt_i$ given by:

$$mt_i = 2\pi f_i \left( \hat{t}_2 - \hat{t}_o - \frac{D_{1a}}{c} - t_{sa} - \frac{D_{2a}}{c} - \hat{t}_o \right) \text{ to wihtin } 2N_i\pi$$

in which $N_i$ is an integer. This equation is the outward equation giving the phase of the tones received by the moving object.

Return Equation

The terminal transmits the result of its measurement to the station at time $t_3$. The station dates the reception of the return signal at time $t_4$. The sum of the distance $D_{2r}$, separating the moving object from the satellite at the time of the transmission ($t_3$) and the distance $D_{1r}$, separating the satellite from the station at the reception time $t_4$ is:

$$D_{2r} + D_{1r} = c(t_4 - t_3) - ct_{sr}$$

i.e. with $t_3 = t_2 + \delta t$ $$D_{2r} + D_{1r} = c(t_4 - t_0) - c(t_2 - t_0) - c\delta t - ct_{sr}$$

By designating ms the time difference measured by the station between the reception times $t_4$ and the reference time $t_0$, we obtain:

$$D_{2r} + D_{1r} = cms - c(t_2 - t_0) - c\delta t - ct_{sr}$$

This is the return equation.

On the basis of the outward and return equations and the equation $\hat{t}_2 - \hat{t}_o = t_2 - t_0$, it is easily possible to obtain the sum of the distances separating the moving object from the satellite at the transmission time of the return signal and the reception time of the outward signal, i.e. respectively $D_{2r}$ and $D_{2a}$, giving:

$$D_{2r} + D_{2a} = -(D_{1r} + D_{1a}) + cms - c\frac{mt_i}{2\pi f_i} - \frac{cN_i}{f_i} - c\delta t - cT_s$$

in which $T_s$ represents the sum of the transit times in the satellite, on the outward and return paths ($t_{sa} + t_{sr}$).

This equation makes it possible to know, for each phase shift $mt_i$, the sum $D_{2r} + D_{2a}$ with an ambiguity due to the factors $$c\frac{N_i}{f_i}.$$

In order to remove this ambiguity, it is possible to use two tones M and m transmitted simultaneously, whose frequencies $f_M$ and $f_m$ are in the ratio a/b, in which a and b are integers. We have $$f_M = \frac{a}{b} f_m.$$

The measurement of of the phases of these two tones makes it possible to reduce the ambiguity on $D_{2r} + D_{2a}$ to the least common multiple (LCM) of $c/f_M$ and $c/f_m$, i.e.

$$b\frac{c}{f_m}.$$

It is also possible to use a framed structure for the outward path and remove the ambiguity with a detection of the measurement time in said frame, the precision required for this dating only being used for said ambiguity, the precise measurement being performed with the aid of a tone. An indication is made of the symbol or bit of said frame where the measurement of the phase has taken place on the tone in order to remove the ambiguity. The time to is then the start of the outward frame.

The process for the determination of distances described hereinbefore is advantageously completed by measurements of changes of these distances with time, i.e. a measurement of speeds or velocities. These measurements are linked with the frequency drifts of the signals transmitted and received through the DOPPLER effect. The DOPPLER effect measurements are performed in the station on receiving bursts transmitted by the terminals when the satellite is in position Tr in FIG. 2. The analysis of the allocated signals of the different DOPPLER effects gives the following equations.

In the forward link, the three frequencies involved $F_{1r}$, $F_{2e}$, $F_{2r}$ are defined by:

$$\begin{cases} F_{1r} = F_{1e} \left( 1 - \frac{S\overline{T}_a * \overline{V}_a}{D_{1a} \cdot c} \right) \\ F_{2e} = F_{1r} + F_{sa} \\ F_{2r} = F_{2e} \cdot \left( 1 - \frac{M\overline{T}_a * \overline{V}_a}{D_{2a} \cdot c} \right) \end{cases}$$

These three relations give the frequency $F_{2r}$ of the signal received by the terminal:

$$F_{2r} = \left\{ F_{1e}\left(1 - \frac{\vec{ST_a} * \vec{V_e}}{D_{1a} \cdot c}\right) + F_{sa} \right\} \left(1 - \frac{\vec{MT_a} * \vec{V_e}}{D_{2a} \cdot c}\right)$$

In the backward link, the three frequencies involved $F_{3r}$, $F_{4e}$, $F_{4r}$ are defined by:

$$\begin{cases} F_{3r} = F_{3e}\left(1 - \frac{\vec{MT_r} * \vec{V_r}}{D_{2r} \cdot c}\right) \\ F_{4e} = F_{3r} + F_{sr} \\ F_{4r} = F_{4e}\left(1 - \frac{\vec{ST_r} * \vec{V_r}}{D_{1r} \cdot c}\right) \end{cases}$$

These three relations give the falling return frequency received by the station:

$$F_{4r} = \left\{ F_{3e}\left(1 - \frac{\vec{MT_r} * \vec{V_r}}{D_{2r} \cdot c}\right) + F_{sr} \right\} \left(1 - \frac{\vec{ST_r} * \vec{V_r}}{D_{1r} \cdot c}\right)$$

On imposing that the frequency $F_{3e}$ of the carrier transmitted by the terminal is generally equal to K times the falling outward frequency received $F_{2r}$, i.e. $KF_{2r}$ and by designating $\dot{r}_{rm}$ the quantity $$\frac{\vec{MT_r} * \vec{V_r}}{D_{2r}}$$

and $\dot{r}_{rs}$ the quantity $$\frac{\vec{ST_r} * \vec{V_r}}{D_{1r}},$$

it is possible to write:

$$\dot{r}_{as} = \frac{\vec{ST_a} * \vec{V_a}}{D_{1a}}$$

$$\dot{r}_{am} = \frac{\vec{MT_a} * \vec{V_a}}{D_{2a}}$$

$$F_{4r} = K \cdot F_{1e} \cdot \left(1 - \frac{\dot{r}_{am}}{c}\right)\left(1 - \frac{\dot{r}_{rm}}{c}\right)\left(1 - \frac{\dot{r}_{rs}}{c}\right)\left(1 - \frac{\dot{r}_{as}}{c}\right) +$$
$$K \cdot F_{sa}\left(1 - \frac{\dot{r}_{am}}{c}\right)\left(1 - \frac{\dot{r}_{rm}}{c}\right)\left(1 - \frac{\dot{r}_{rs}}{c} + F_{sr1} - \left(\frac{\dot{r}_{rs}}{c}\right)\right)$$

The orbit determination makes it possible to know $T_a$, $T_r$, $\vec{V_a}$, $\vec{V_r}$, i.e. a relation linking $\dot{r}_{as}$ and $\dot{r}_{rs}$, so that:

$$F_{4r} = K \cdot F_{1e} \cdot \left(1 - \frac{\dot{r}_{rm}}{c}\right)^2 \left(1 - \frac{\dot{r}_{rs}}{c}\right)^2 +$$
$$KF_{sa} \cdot \left(1 - \frac{\dot{r}_{rm}}{c}\right)^2 \left(1 - \frac{\dot{r}_{rs}}{c}\right) + F_{sr}\left(1 - \frac{\dot{r}_{rs}}{c}\right)$$

Therefore the quantity $\dot{r}_{rm}/c$ can be calculated on the basis of all the other quantities:

$$\frac{\dot{r}_{rm}}{c} = f\left(F_{4r}, F_{1e}, F_{sa}, F_{sr}, K, \frac{\dot{r}_{ra}}{c}\right)$$

The station measures the frequency $F_{4r}$, which is the frequency of the return signal which it receives. In addition, the station-satellite distances ($D_{1a}$, $D_{1r}$) and the relative station-satellite velocity Va are known through knowing the orbit of the satellite. This knowledge can be obtained as a result of an orbit determination process performed in the station conventionally by using a tone-modulated carrier, such as is described in the aforementioned document "Ranging Standard".

I claim:

1. Method for locating moving objects, in which a forward-backward radio link is established between a ground station and a moving object to be located equipped with a terminal, through an artificial satellite, and the moving object is located on the basis of compared characteristics of the radio signals of the forward-backward link, said method being characterized in that it comprises the following operations:

A) in the forward link:

from the ground station (10) is transmitted, at a time ($t_1$) counted as from a reference time ($t_0$) individual to the station, an outward signal (20) constituted by a carrier having a given frequency ($F_1$) modulated by at least one sinusoidal tone signal, each tone having a given frequency ($f_i$) and a phase, the instantaneous phases of all the tones being zero at the reference time ($t_0$) individual to the station, the outward signal (20) is received in the satellite (12) and an outward signal (22) is retransmitted with a certain time delay linked with the transit time ($t_{sa}$) in the satellite (12), the outward signal (22) retransmitted by the satellite (12) is received in the terminal (16) of the moving object (14) to be located and measurement takes place of the phase ($mt_i$) of the tone or tones received at a particular time ($t_2$).

B) in the backward link:

formation takes place of a return signal in the terminal (16) of the moving object (14) by modulating a carrier having a certain frequency ($F_3$) by the information corresponding to the results of the phase measurement of the tone or tones ($mt_i$) and a spectrum spreading operation takes place on said carrier modulated by a spreading code linked with the particular time ($t_3$) displaced from the measurement time ($t_2$) by a given quantity ($\delta t$), from the terminal (16) of the moving object (14) is transmitted a spread spectrum return signal (24) at said particular time ($t_3$), said return signal (24) is received in the satellite (12) and a return signal (26) is retransmitted with a certain time delay linked with the transit time ($t_{sr}$) in the satellite, in said station (10) is received the return signal (26) retransmitted by the satellite (12) and the spectrum of the signal received is despread and then said signal is demodulated to restore the information relative to the phase difference measurement ($mt_i$).

the reception time ($t_4$) of these measurements ($mt_i$) is dated by intercorrelation between the spreading code received and an identical expected code, on the basis of the phase measurements ($mt_i$) of the reception time of the measurements ($t_4$), the displacement between the measurement time and the transmission time by the terminal, transit times in the satellite ($\delta t$, $t_{sr}$, $t_{sa}$), the station-satellite distance ($D_{1r}$) at the reception time ($t_4$), the station-satellite distance ($D_{1a}$) at the transmission time ($t_1$), the sum of the distances of the outward and return paths ($D_{2a}+D_{2r}$) between the satellite and the moving object is deduced, which locates the moving object.

2. Method according to claim 1, characterized in that measurement also takes place of the frequency shifts between the transmitted signals and the received signals in order to evaluate the DOPPLER effects.

3. Method according to claim 1, characterized in that, in the forward link, use is made of at least two tones of different frequencies $f_M$ and $f_m$, said two frequencies being linked by $$f_M = \frac{a}{b} f_m,$$

in which a and b are integers.

4. Method according to claim 1, characterized in that, in the forward link, use is made of a tone of frequency $F_M$ which is a multiple of the bit, that the forward link is made with a framed structure and that indication takes place of the symbol or bit of said frame where the phase measurement took place on the tone in order to eliminate the ambiguity.

* * * * *